US007188875B2

(12) United States Patent  (10) Patent No.: US 7,188,875 B2
Norelius  (45) Date of Patent: Mar. 13, 2007

(54) UNDERRUN PROTECTION FOR VEHICLES

(76) Inventor: Jan-Erik Norelius, Storgatan 7B, Ostersund (SE) SE-831 30

( * ) Notice: Subject to any disclaimer, the term of this patent is extended or adjusted under 35 U.S.C. 154(b) by 0 days.

(21) Appl. No.: 10/505,675

(22) PCT Filed: Feb. 26, 2003

(86) PCT No.: PCT/SE03/00320

§ 371 (c)(1),
(2), (4) Date: Aug. 25, 2004

(87) PCT Pub. No.: WO03/093066

PCT Pub. Date: Nov. 13, 2003

(65) Prior Publication Data

US 2005/0104390 A1 May 19, 2005

(30) Foreign Application Priority Data

Feb. 28, 2002 (SE) .................... 0200616

(51) Int. Cl.
B60R 19/42 (2006.01)

(52) U.S. Cl. ..................... 293/128; 293/118

(58) Field of Classification Search ............... 293/118, 293/126, 128, 131, 132
See application file for complete search history.

(56) References Cited

U.S. PATENT DOCUMENTS 4,217,715 A * 8/1980 Bryan, Jr. ..................... 40/591
4,247,138 A * 1/1981 Child ......................... 293/103
4,688,824 A * 8/1987 Herring ....................... 280/762
5,673,953 A * 10/1997 Spease ........................ 293/118
6,760,986 B1 * 7/2004 MacNeil ...................... 40/200
6,764,116 B2 * 7/2004 Ledford et al. ............. 293/102
6,764,118 B2 * 7/2004 DePottey et al. ........... 293/118

FOREIGN PATENT DOCUMENTS

DE    26 34 880        2/1978
DE    91 16092 8       4/1992
DE    43 24 803 A1     3/1994
DE    43 17 391 A1     12/1994
EP    0 857 620 A1     8/1998

* cited by examiner

Primary Examiner—H Gutman
(74) Attorney, Agent, or Firm—Young & Thompson

(57) ABSTRACT

An underrun protection intended for vehicles, includes a stiff sheet unit attachable to the vehicle including on one hand a first box, which is composed of a bottom wall and a border located along the periphery thereof, and which is articulatedly connected to a fastening unit attached to the vehicle in order to be able to be turned between a folded-down position and a folded-out position in which the space under the platform of the vehicle is made accessible, and on the other hand a second box which is intended for enclosing an information carrier and which includes a transparent sheet and a frame surrounding the same, the frame being articulatedly connected to the border of the first box in order to be able to be turned between a folded-in position in the first box and a folded-out position in which the information carrier is exchangeable.

14 Claims, 3 Drawing Sheets

UNDERRUN PROTECTION FOR VEHICLES

TECHNICAL FIELD OF THE INVENTION

Figure 1:
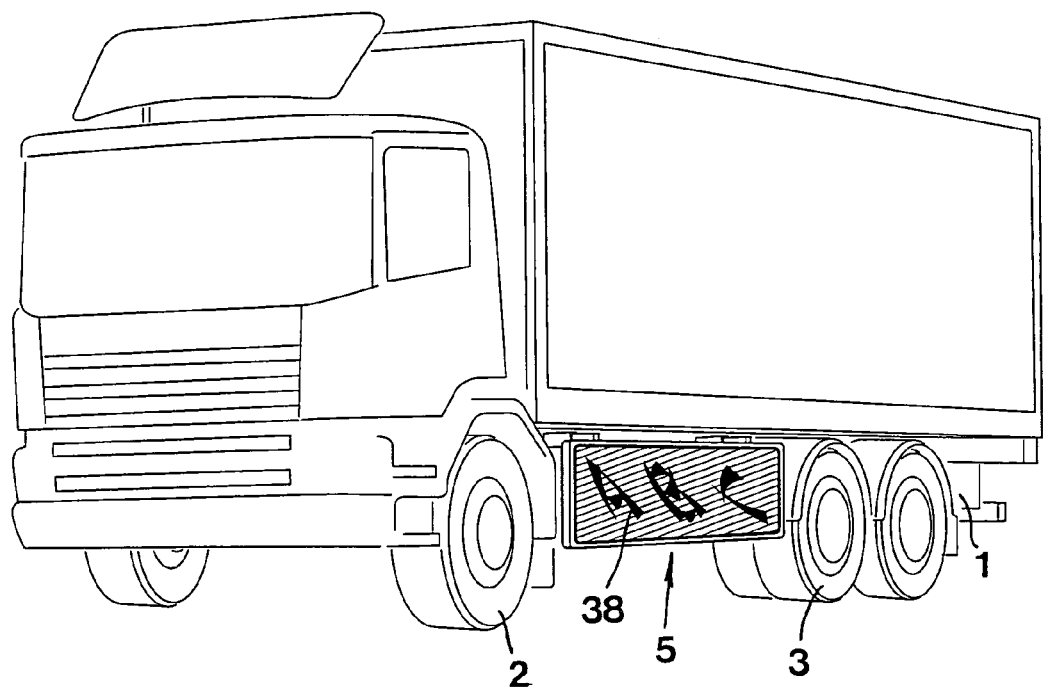

This invention relates to an underrun protection for vehicles of the type that includes a wheel-carried chassis having a platform or the like, the underrun protection comprising a stiff sheet unit fastenable on the vehicle having the purpose of partly covering the free space under the platform, thereby counteracting running-in under the platform by other vehicles.

BACKGROUND OF THE INVENTION

Along the two long sides of such vehicles as lorries, there is a free space between the front wheel sets and rear wheel sets and under the part of the platform of the vehicle that protrudes from the chassis or the frame work constituting a risk factor in regard of road safety in so far that other vehicles, such as private cars, two-wheelers and the like, may drive into the same and become wedged up under the projecting platform section. In this connection, the platform section may give rise to serious personal injuries. In order to avoid such underrun accidents, the vehicles may be provided with particular underrun protections that essentially extend in flush with the long sides of the platform or addition in order to cover most of the space between the front and rear wheels. However, previously known underrun protections are permanently immovably fixed in relation to the vehicle chassis, more precisely by the covering sheet unit being stiffly united to a fastening unit, which is in turn stiffly connected to the chassis, e.g. by means of welded or bolt joints. The fact that the underrun protection is fixed in a given position makes it difficult or impossible to practically utilize the storage box or storage boxes that usually are mounted on the chassis in the area immediately under the platform. Another shortcoming of the known underrun protections is that the same are not suitable for exposing commercial and/or information messages, in spite of the fact that the same are well visible, for instance from the side of the vehicle.

OBJECTS AND FEATURES OF THE INVENTION

The present invention aims at obviating the above-mentioned shortcomings of the previously known underrun protections and at providing an improved underrun protection. Thus, a primary object of the invention is to provide an underrun protection that on one hand enables simple and convenient access to such storage boxes that according to the standard practice are found on the frame works of, for instance, lorries and on the other hand is suitable for clear exposure of information messages. Another object of the invention is to provide an underrun protection that permits exchange of the desired information or commercial messages in a fast and convenient way. Furthermore, said message should be possible to illuminate with the purpose of making the same extraordinarily well visible.

According to the invention, at least the primary object is attained by the features defined in the characterizing clause of claim 1. Preferred embodiments of the underrun protection according to the invention are furthermore defined in the dependent claims.

BRIEF DESCRIPTION OF THE APPENDED DRAWINGS

Figure 2:
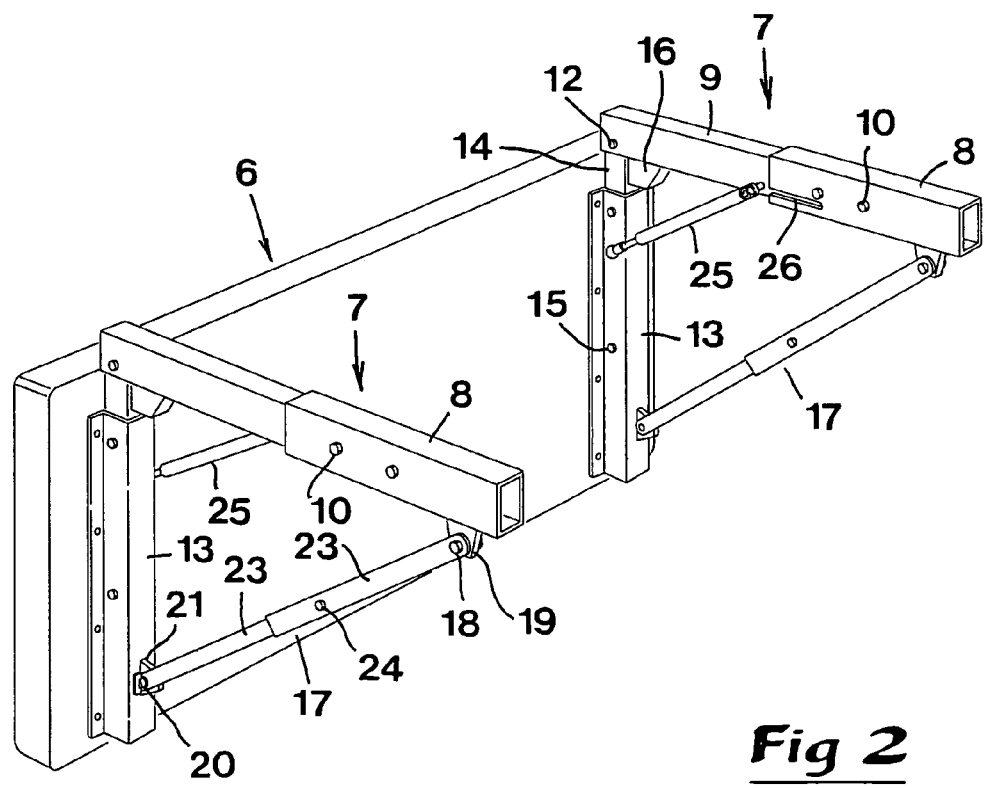
Figure 3:
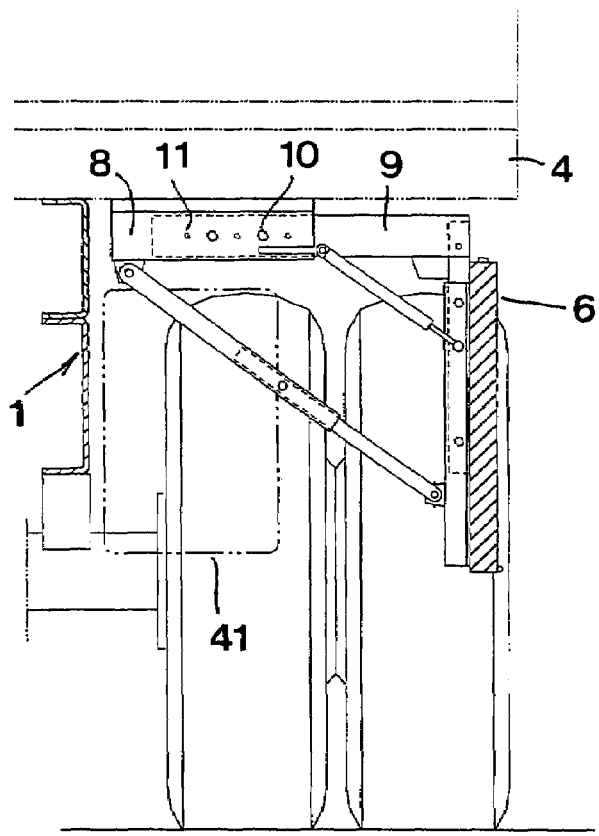
Figure 4:
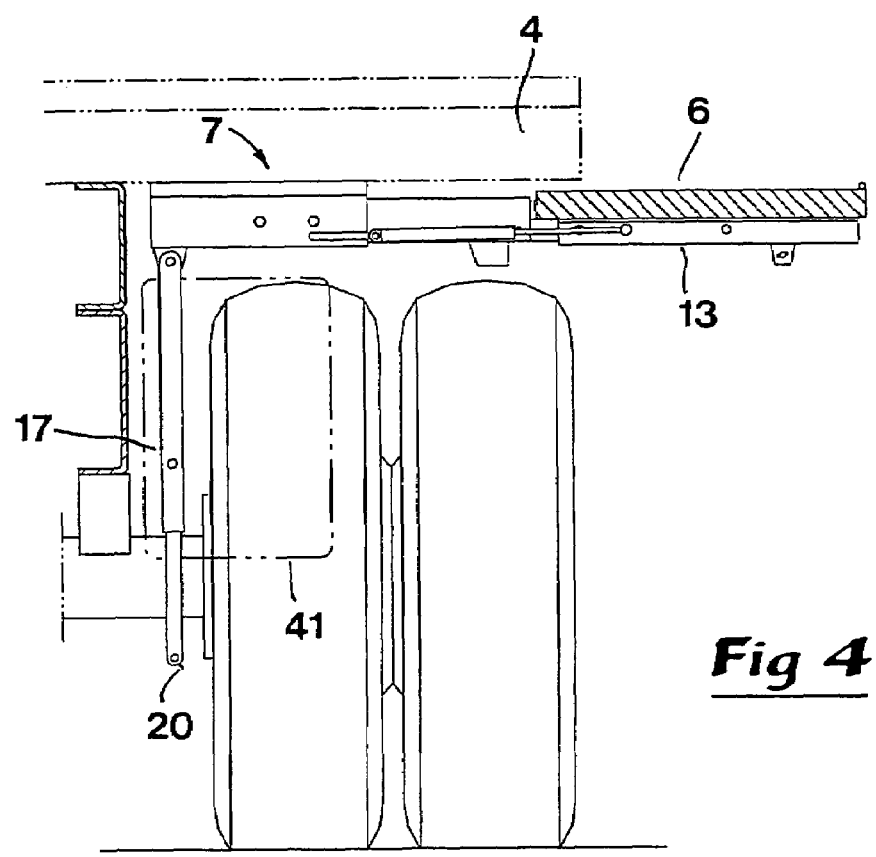
Figure 5:
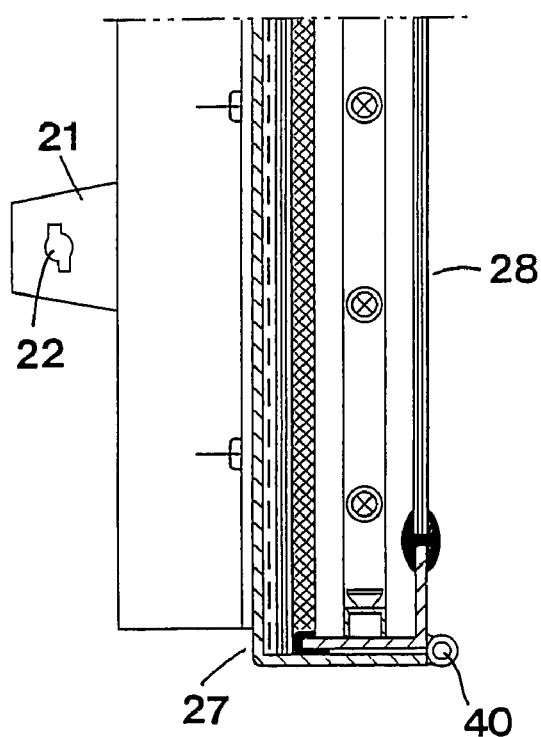
Figure 6:
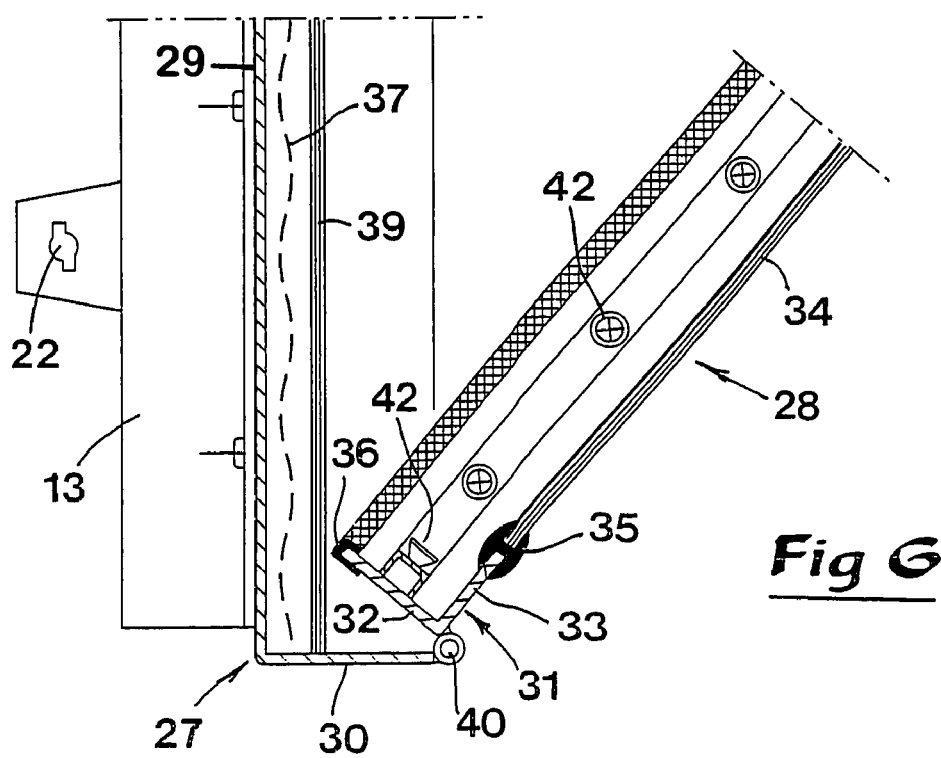

In the drawings:

FIG. 1 is a perspective view of a vehicle using the underrun protection according to the invention, FIG. 2 is a perspective view of an underrun protection seen obliquely from behind, FIG. 3 is a partial section showing the sheet unit of the underrun protection in a folded-down, fixed and active underrun-protecting position, FIG. 4 is an analogous section showing the sheet unit of the underrun protection in a folded-out position, FIG. 5 is an enlarged partial cross-section through said sheet unit, a light box included in the same being shown let-in in an outer box, and FIG. 6 is an analogous cross-section showing the light box partly turned-out from the outer box.

DETAILED DESCRIPTION OF A PREFERRED EMBODIMENT OF THE INVENTION

In FIG. 1, a vehicle in the form of a lorry is shown having a chassis 1 being carried by front and rear wheel sets 2 and 3, respectively. On the chassis, which is illustrated in the form of two channel irons in FIGS. 3 and 4, a platform 4 or a house-like addition is mounted. Although the detail 4 (in FIGS. 3 and 4) may consist of a bottom to the vehicle addition, the concept "platform" will henceforth be used exclusively, for the sake of simplicity. As is clearly seen in FIGS. 3 and 4, a part of the platform protrudes laterally from the chassis 1, the outer long side edge of the platform being situated approximately in flush with the outside of outer wheels in the rear wheel set of the vehicle.

As is seen in FIG. 1, an underrun protection, in its entirety designated 5, is arranged in the space between the front and the rear wheel sets 2, 3. The same includes on one hand a sheet unit, in its entirety designated 6 (see FIG. 2), and on the other hand two fastening units 7 that are mountable onto the vehicle, more precisely underneath the platform 4.

The inside of the sheet unit 6 will be more closely described below, reference being made to FIGS. 5 and 6. Initially, reference is however made to FIGS. 2–4, which illustrate the mounting of the sheet unit on the vehicle.

In the example, the sheet unit 6 is carried by two spaced-apart fastening units that are located near the front and rear short ends of the sheet unit. The individual fastening unit 7 includes a crossbar 8 extending transverse to the plane of the sheet unit, which crossbar is permanently attached in a given position underneath the platform 4, e.g. by means of a bolted or welded joint (not shown). In the illustrated, preferred embodiment, the crossbar 8 consists of a first box profile into which a second, thinner box profile 9 is inserted. Said second box profile 9 is displaceably movable inside the first box profile 8 and lockable in different positions in relation to the same, e.g. by means of one or more bolts 10 insertable in selected holes in a series of holes 11 in the box profile 8. At the free outer end thereof, the box profile 9 has a main hinge 12 around which the sheet unit 6 is turnable. Said main hinge may advantageously consist of a robust dowel mounted in a bushing. On the backside or inside of the sheet unit 6, a guide 13 is arranged for each fastening unit, e.g. in the form of a flange-provided channel bar. Into this guide 13, an arm 14, to which the main hinge 12 is connected, is inserted, and which is adjustable and lockable in different axial positions in the guide. Locking of the arm in relation to the guide may be carried out by means of one or more bolts or pins 15. By the guide 13 and the arm 14 being mutually movable, the sheet unit 6 may be set in different level positions in relation to the fastening unit 7 and platform 4, respectively.

Underneath the box profile 9, a fixed shoulder 16 is applied, against which the arm 14 is pressable in order to be located perpendicularly to said box profile. In this connection, it should be pointed out that the lower flange of the box profile 9 is partly cut off in order to house the upper end of the arm 14. The main hinge 12 permits turning of the sheet unit in the direction outwards/upwards to the laterally folded-out state that is shown in FIG. 4. However, in the folded-down state according to FIG. 3, the arm 14 is stopped in a vertically pendent position by means of the stop shoulder 16.

Between the individual box profile 8 and the guide profile 13, a diagonal bracing 17 serving as a push rod extends, the inner end of which is connected to an ear 19 on the bottom side of the box profile 8 via a hinge 18, while the opposite end is connected to an ear 21 on the inner side of the guide profile 13 via a second hinge 20. The hinge 20 is in the form of a quick-action lock, e.g. in the form of a pin, which is insertable in a key hole-like opening 22 in the ear (see FIG. 5).

As is seen in FIG. 2, the ear 21 is located near the lower end of the guide profile 13, i.e. near the lower edge of the sheet unit 6, while the ear 19 is located in the immediate vicinity of the inner end of the box profile 8. By the location of the ears, the diagonal bracing 17 obtains a maximum length in order to be able to absorb great forces that are applied to the sheet unit from outside. Furthermore, it should be pointed out that the diagonal bracing 17 includes two parts, adjustably movable in relation to each other, in the form of telescopic tubes 23, 23' that may be locked in a desired position in relation to each other by means of a locking screw 24 or the like. Thanks to the fact that the telescopic tubes 23, 23' are adjustably movable, the length of the diagonal bracing may be adapted to different mounting positions for the sheet unit. Said mounting positions depend on how much the slender box profiles 9 are protruded from the box profiles 8 as well as how far the arms 14 are put into the guide profiles 13.

Between the individual guide profile 13 and each box profile 9, a gas spring 25 acts with the purpose of at least facilitating turning of the sheet unit 6 in the direction outwards/upwards. Each such gas spring 25 is connected to the sides of the profiles 9, 13 via pivot pins. In the box profile 8, a slot 26 is recessed, into which the upper hinge of the gas spring may be inserted if the box profile 9 is to be inserted far into the box profile 8.

In this connection, it should be pointed out that the underrun protection according to the invention also may be manufactured having one single predetermined mounting position for the sheet unit 6. In this case, the pendent arm 14 may be in direct connection with the back side of the sheet unit 6, and the fastening unit 7 made from one single girder or section.

Reference is now made to FIGS. 5 and 6, which illustrate the construction of the sheet unit 6 more in detail. Principally, the sheet unit is composed of two mutually turnable boxes 27, 28, the first-mentioned one of which includes a bottom or inner wall 29, along the periphery of which a border 30 extends, which forms a rectangular frame that is outwardly open. The other box 28 includes a rectangular frame 31 in the form of an L-section having a gable flange 32 and a front flange 33. Said front flange 33 is comparatively slender and has in the example a width that is smaller than the width of the gable flange 32. In flush with the front flange 33, a transparent sheet 34 is mounted, which is kept in place in the open space between the front flanges 33 of the box by means of semi-rigid, sealings 35. Said sealings 35, which may consist of rubber or the like, guarantee that moisture does not get into the interior of the sheet unit. Also at the inner edge of the gable flanges 32 of the frame 31, a circumfering sealing 36 is arranged. It should in particular be observed that said sealing 36 extends solely along the inner edges of the flanges 32 and that the interior of the box 28 opens rearwards (against the bottom wall 29 of the box 27).

An information or advertising carrier 37, for instance consisting of a sheet of board or paper or of a plastic film of a suitable thickness, may be applied against the bottom wall 29. On the outside of the carrier 37, a message of the type that is outlined at 38 in FIG. 1 is printed or applied in another way. Outside of the information carrier 37, a second transparent sheet 39 is arranged, e.g. in the form of a plastic sheet such as PLEXIGLAS®.

The outer corner of the frame 31 in the box 28 is connected to the outer edge of the lower border of the border piece 30 via a hinge 40. Via the hinge 40, the box 28 may be turned between on one hand a fully folded-in position in the box 27 according to FIG. 5, and a folded-out position according to FIG. 6. In practice, the box 28 should be possible to turn at least 180°, suitably 270°, in relation to the box 27.

The Function and the Advantages of the Underrun Protection According to the Invention When mounting the underrun protection, the two box profiles 8 are initially fixed to the bottom side of the platform 4, and then the box profiles 9 are inserted so far into the box profiles 8 that the sheet unit 6 will hang down approximately in flush with the long side edge of the platform 4 (see FIG. 3). After this, the box profiles 9 are fixed by means of the mounting bolts 10 (or screws). Furthermore, the sheet unit 6 is adjusted to the desired level by the fact that the guide profiles 13 are brought to the desired position along the arms 14, and then fixing is carried out by means of the mounting bolts 15 (or screws). In a final step, the outer ends of the diagonal bracings 17 are connected to the ears 21 positioned furthest down on the guide profiles 13. When this is carried out, the telescopic tube 23' is still displaceable in relation to the telescopic tube 23. As soon as the length of the diagonal bracing has been determined by the quick coupling key 20 being fixedly coupled into the ear 21, the telescopic tube 23 is, however, fixed by tightening of the locking screw 24, whereby the length of the diagonal bracing is finally settled. In this connection, it should be pointed out that the hinge 18 is permanently connected to the ear 19.

In the state described above, the sheet unit covers a large part of the free space between the platform 4 and the ground under the vehicle, whereby running-in under the platform is counteracted.

In FIGS. 3 and 4, a storage box 41 is found on the vehicle according to the standard practice, shown by means of dash-dotted lines. Said box is located on the outside of the chassis 1 and near the bottom side of the platform. As is seen in FIG. 3, the storage box is extraordinarily difficult to reach when the sheet unit 6 of the underrun protection is fixed in the vertically pendent position thereof.

If access to a storage box 41 is desired, the sheet unit 6 is folded out to the position illustrated in FIG. 4. This may be effected by the simple measure of releasing the quick coupling keys 20 and bringing the sheet to turn outwards/upwards. Such a folding-out may be effected either by means of solely the gas springs 25, if the same are sufficiently powerful, or by a combination of the action of the gas springs and manual lifting of the sheet unit.

When the use of the storage box is concluded, the sheet unit is again folded down to the vertical, active state thereof. During the folding-down, the stop shoulder 16 ensures that the sheet unit is located in an exact vertical position, which implies that the ear 21 is immediately located in the correct position for receipt of the quick coupling key 20 when the diagonal bracing 17 is to be connected to the sheet unit 6 again.

If the information carrier 37 is to be replaced, the box 28 is folded out of the box 27, and then the sheet 39 and the proper advertising carrier 37 is removed from the interior of the box 27. Depending on the external circumstances, the box may 28 be folded out at different angles in relation to the box 27, e.g. 180° or 270°. During exchange of the advertising carrier, the box 27 may either remain in the vertical position thereof, or be folded out to the horizontal position shown in FIG. 4. In the next step, a new advertising carrier 37 is inserted along with a covering PLEXIGLAS® sheet 39, and then the box 28 is again folded into the box 27. When the box 28 is folded in, the same will, with the sealing 36 thereof, press the sheet 37 in the direction of the bottom wall 29 of the box 27, the advertising carrier 37 being fixedly clamped between the bottom wall 29 and the sheet 39. The seal 36 is elastically pressed not only against the outside of the sheet 39, but also against the inside of the border 30.

In other words, exchange of advertising or information carrier may be effected in a fast and convenient way.

With reference to FIG. 6, it should be pointed out that the box 28 has lamps 42 in the interior thereof, e.g. light emitting diodes, in order to light up the interior of the box, thereby in a marked way making the message on the advertising carrier 37 clear. As is seen in FIG. 6, said lamps 42 are arranged comparatively close to each other at the inside of the frame 31 and directed inwards towards the centre of the box 28.

An important advantage of the invention is that access to storage boxes or other parts occurring on the chassis is not obstructed by the presence of the underrun protection on the vehicle. Another advantage is that the underrun protection in an effective way may be utilized in order to expose an information or commercial message, a particular advantage being the fact that exchange of the information-carrier may be carried out in a fast, simple and convenient way.

Feasible Modifications of the Invention

The invention is not solely limited to the embodiment described above and illustrated in the drawings. Thus, the underrun protection may in a particularly simple and inexpensive version be manufactured without the possibility of adjusting the sheet unit to different positions laterally and vertically, respectively. It is also feasible to spare the gas springs, the sheet being manipulated in solely the manual way.

The invention claimed is:

1. Underrun protection for vehicles of the type that includes a wheel-carried chassis (1) having a platform (4), comprising:
    a stiff sheet unit (6) fastenable on the vehicle and which has the purpose of partly covering the free space under the platform (4), thereby counteracting running-in under the platform by other vehicles, the sheet unit (6) comprising a first box (27), which is composed of a bottom wall (29) and a border (30) located along the periphery thereof, and which is articulatedly connected to at least one fastening unit (7) mountable on the vehicle in order to be able to be turned between a folded-down, underrun-protecting position, and a folded-out position in which the space under the platform (4) is made accessible, and a second box (28) for enclosing an information carrier (37) and which comprises a transparent sheet (34) and a frame (31) surrounding the same, said frame being articulatedly connected to the border (30) of the first box in order to be turned between a folded-in position in the first box (27) and a folded-out position in which the information carrier (37) is exchangeable,
    wherein the second box (28) of the sheet unit is inwardly open and provided with a circumfering sealing (36) arranged to be sealingly pressed against a transparent sheet (39) on the outside of the information carrier (37), as well as against the inside of the border (30) of the first box (27).

2. Underrun protection according to claim 1, wherein said at least one fastening unit comprises two spaced-apart fastening units (7), each individually including a crossbar (8) which is fastenable on the bottom side of the platform (4) and to which an end of a diagonal bracing (17) is articulatedly connected, the opposite end of which being directly or indirectly detachably connected to the bottom part of the first box (27).

3. Underrun protection according to claim 2, wherein between the crossbar and the first box (27), a gas spring (25) acts that always aims to turn the box out towards the folded-out position.

4. Underrun protection according to claim 3, wherein the crossbar includes a first box profile (8), which is permanently attachable on the bottom side of the platform (4), and a more slender second box profile (9), which is displaceably inserted in the first box profile and lockable in the desired axial positions in relation to the same.

5. Underrun protection according to claim 4, wherein the second box profile (9) is connected to an arm (14) at a free end via a main hinge (12), the sheet unit being adjustable and lockable in different positions in relation to the arm.

6. Underrun protection according to claim 5, further comprising a stop shoulder (16) on the underside of the second box profile (9), which shoulder prevents the sheet unit from being turned inwards from a vertical position.

7. Underrun protection according to claim 2, wherein the crossbar includes a first box profile (8), which is permanently attachable on the bottom side of the platform (4), and a more slender second box profile (9), which is displaceably inserted in the first box profile and lockable in the desired axial positions in relation to the same.

8. Underrun protection according to claim 7, wherein the second box profile (9) is connected to an arm (14) at a free end via a main hinge (12), the sheet unit being adjustable and lockable in different positions in relation to the arm.

9. Underrun protection according to claim 8, further comprising a stop shoulder (16) on the underside of the second box profile (9), which shoulder prevents the sheet unit from being turned inwards from a vertical position.

10. Underrun protection according to claim 1, further comprising lamps (42) inside the second box (28) in order to light up the interior of the sheet unit.

11. An underrun protection for a vehicle of the type that includes a wheel-carried chassis having a platform, comprising:
    a fastening unit adapted to be mounted on the vehicle; and
    a sheet unit that is attached to said fastening unit and that is adapted to cover at least part of a free space under the platform of the vehicle,
    said sheet unit having a first box with a bottom wall and a border along a periphery thereof, said first box being pivotally connected to said fastening unit so that said first box is movable between a folded-down, underrun-protecting position, and a folded-out position in which the space under the platform is accessible, said first box carrying an information carrier and a transparent sheet on said bottom wall, said sheet unit also having a second box that has a peripheral frame that nests inside said first box with an edge of said frame being adjacent to said bottom wall of said first box, said second box being pivotally connected to said border of said first box so that said second box is movable between a folded-in position inside said first box and a folded-out position in which said information carrier is accessible, said sheet unit also having a peripheral seal that is sealingly arranged between the edge of said second box and said transparent sheet and between the edge of said second box and an interior of said first box.

12. The underrun protection according to claim 11, wherein said fastening unit comprises a first hollow member that is arranged to be attached to the platform, a second member that is displaceably inserted inside said first hollow member, and a lock that secures said second member at a selected position inside said first hollow member.

13. The underrun protection according to claim 12, wherein said fastening unit further comprises an arm that is pivotally connected to a free end of said second member, said first box being connected to said arm so that said sheet unit is movable between the folded-down and the folded-out positions.

14. The underrun protection according to claim 13, wherein said second member comprises a stop shoulder adjacent to said arm that prevents said sheet unit from being turned inwards to a folded-in position.

* * * * *